W. G. DOTY.
PROCESS FOR MAKING MACHINE ELEMENTS.
APPLICATION FILED DEC. 26, 1917.

1,348,158.

Patented Aug. 3, 1920
4 SHEETS—SHEET 3.

WITNESSES:
R. W. Hoagland
J. J. Sprain

INVENTOR
Walter G. Doty
BY
ATTORNEY

W. G. DOTY.
PROCESS FOR MAKING MACHINE ELEMENTS.
APPLICATION FILED DEC. 26, 1917.

1,348,158.

Patented Aug. 3, 1920.
4 SHEETS—SHEET 4.

UNITED STATES PATENT OFFICE.

WALTER G. DOTY, OF DAYTON, OHIO, ASSIGNOR TO THE WAGNER ENGINEERING COMPANY, OF DAYTON, OHIO, A CORPORATION OF OHIO.

PROCESS FOR MAKING MACHINE ELEMENTS.

1,348,158.

Specification of Letters Patent.

Patented Aug. 3, 1920.

Application filed December 26, 1917. Serial No. 208,959.

*To all whom it may concern:*

Be it known that I, WALTER G. DOTY, a citizen of the United States, residing at Dayton, in the county of Montgomery and State of Ohio, have invented certain new and useful Improvements in Processes for Making Machine Elements, of which the following is a specification.

My invention relates to the production of machine elements and particularly to a process or method of producing smooth finished gears, racks, cams and like parts without the necessity of machine operation.

The object of the invention is to improve the process of making cast metal and other gears, cams and like elements by a process of molding same from metal or from plastic self-hardening material whereby they will not only be cheapened in production but will be more efficient in use, more durable and uniform in operation, economical and unlikely to get out of repair.

A further object of the invention is to provide a process or method for accurately forming the teeth of gear wheels and the operating surfaces of cams which will afford a smoothly finished working surface without the necessity of cutting or finishing such surfaces by subsequent machine operations.

A further object of the invention is to provide a process or method for reinforcing gears, cams and like elements whereby they will have less tendency to break while in usage and whereby in the event of breakage the parts will be held together temporarily, thus reducing danger from flying pieces.

A further object of the invention is to provide a process or method by which the vibrations of such machine elements will be materially dampened, thereby rendering the parts less noisy in operation.

A further and important object of the invention is to improve the method or process of manufacturing gears, cams and like machine elements by a casting or molding process involving the use of molten metal or of plastic self-hardening material as hereinafter described.

With the above primary and other incidental objects in view as will more fully appear in the specification, the invention appears in the specification, the invention consists of the features of construction, the parts and combinations thereof and the process or mode of production and operation, or their equivalents, as hereinafter described and set forth in the claims.

Referring to the drawings.

Like parts are indicated by similar characters of reference throughout the several views.

The present method of manufacturing gears, cams and like machine elements involves the use of an initial blank of metal or other material in which the teeth are milled or cut by means of a suitable miller or hobb. In some instances gears have been cast with integral teeth but the expansion and contraction of the metal while in the mold tends to distort the gears and results in misshaped and irregular teeth. Likewise the cast or molded surface is rough and pitted from its conformity with the sand mold. Such a rough and pitted surface is not efficient or desirable upon either gear teeth or the working surfaces of cams. For this reason and because of the tendency to warp or distort, cast or molded gears, cams and like machine elements necessitate additional machine operations to afford finished working surfaces thereon.

The present method or process is designed to afford commercial gears, cams and like elements of the character disclosed in my co-pending application, Serial No. 176,870, filed June 25th, 1917, which may be molded or cast in suitable molds, the teeth and working faces of which will be formed sufficiently smooth and accurate in the mold as to obviate the necessity for machine operation. The process is designed to produce upon the faces and blanks of gear teeth and the working surfaces of cams a smooth durable wearing surface more efficient and desirable than that produced by the ordinary casting or molding method, and closely approximating the finish afforded by milling or other machine operation.

Figures 1, 2, 3, 4, 5, 6:
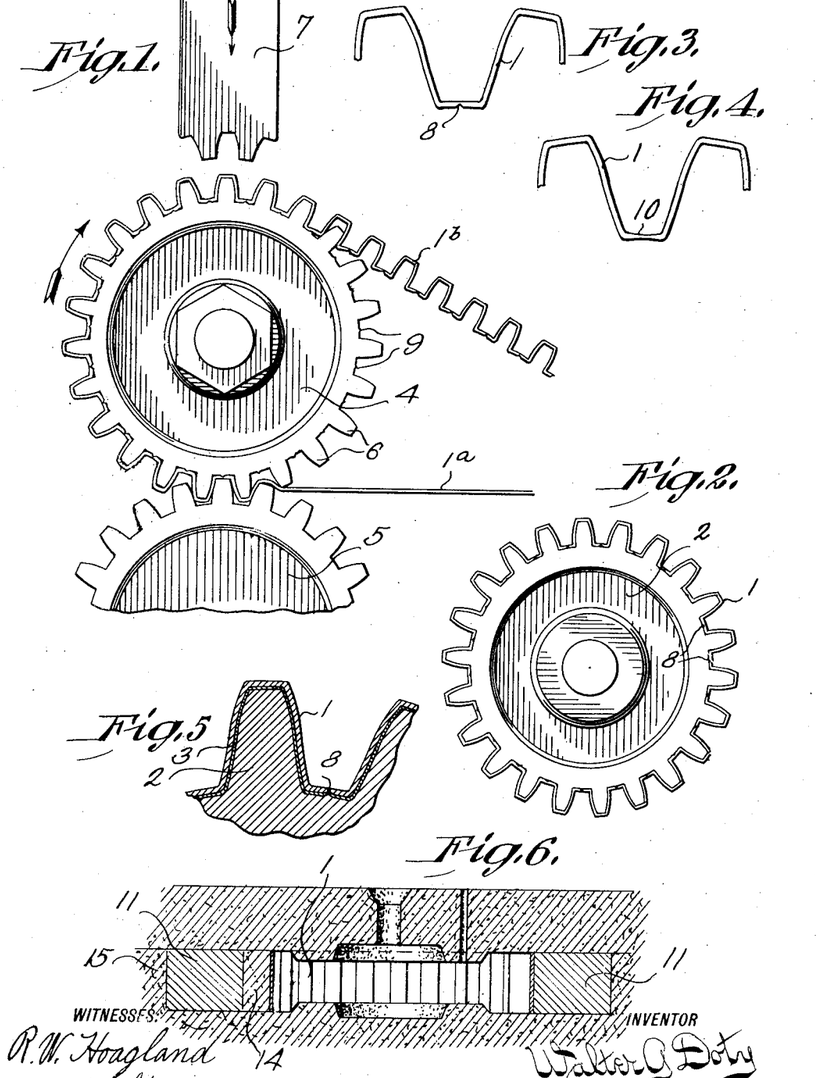
Figure 1 is a side elevation of the forming tools for corrugating the peripheral rim or facing strip.
Fig. 2 is a side elevation of the finished gear.
Figs. 3 and 4 are detail views of tooth forms of the peripheral rim.
Fig. 5 is a detail sectional view of the completed gear tooth the several strata being enlarged or exaggerated.
Fig. 6 is a sectional view of the sand mold for the gear, with the peripheral corrugated reinforcement and facing strip or rim positioned therein and the master form or ring inclosing the corrugated rim within the mold.

The finished product illustrated in Fig. 2 comprises a corrugated peripheral rim 1 preferably of steel but which may be of bronze or other suitable material or metal which incloses a body 2 of cast iron or other cast metal. The body 2 conforms to the interior of the corrugated peripheral rim, whereby the corrugations of said rim form reinforcement faces of the gear teeth. Interposed between the rim 1 and main body 2 is a film or stratum 3 of softer material, such as tin which serves to dampen the rattle or clatter of intermeshing gears.

Not only do the corrugations of the peripheral rim form a more smooth and better wearing surface for the gear teeth than that afforded by the cast metal of which the body 2 is composed, but it also serves to reinforce the body 2 against breakage or cracking. In the event that the body 2 is cracked it holds the several pieces in close union, thereby preventing accidents and injury to the machine or to the operator.

The corrugated peripheral facing rim 1 may be formed in any suitable manner such as by passing a strip of the desired material between a succession of forming rolls, or by a succession of forming operations intermediate substantially straight dies and suitable coacting punches. In Fig. 1 there has been shown a method in which the strip of material to be operated upon, indicated at 1$^a$, is passed intermediate two forming members 4 and 5, each provided with suitable gear teeth, intermeshing with one another. These teeth are adapted to initially or roughly form the corrugations in the strip 1$^a$.

To produce the desired effect, the teeth 6 of the forming roll 4 are of less dimensions than the desired teeth to be produced upon the finished gear. Having determined the size and pitch of the finished gear product, the master form 4 is cut or machined from a suitable blank in the usual manner. As shown in the drawing, the teeth of the forming member 5 are of normal dimensions, while the teeth of the forming roller 4 are of less than normal dimensions, being equivalent to the normal tooth less the thickness of the strip 1$^a$ acted upon about the entire periphery of the tooth. Thus when the strip 1$^a$ is accurately formed about the teeth 6 by the action of the forming punch hereinafter mentioned, the teeth 6 plus the strip 1$^a$ extending thereabout becomes substantially equivalent to a normal tooth.

Intermeshing teeth of the shape shown in Fig. 1 will not form the strip 1$^a$ accurately to the contour of the tooth. The strip will only be roughly shaped or corrugated by the rolling or intermeshing action of the teeth of the forming members 4 and 5. However, there is provided a reciprocatory forming member or punch 7 coacting with the toothed member 4. The toothed forming member 4 is advanced intermittently or through a step by step movement by any suitable mechanism and during the intervening intervals of rest, the reciprocatory forming tool or punch 7 is brought into engagement with each succeeding tooth thereby closely setting the initially or roughly corrugated strip 1$^a$ into close conformity with the tooth 6 of the forming roller 4. As thus set or conformed upon the tooth 6 the exterior line of the corrugation will conform with the outline of the desired tooth to be produced upon the finished product. The finished corrugated strip illustrated at 1$^b$ may be formed of any desired length and pieces may be subsequently cut therefrom of sufficient length to form the gear rims of desired dimensions. If these corrugated or finished strips are to be used only in the production of gears of a size equal to the forming member 4, little or no distortion would occur in bending the corrugated strip into annular form preparatory to casting the gear body 2 therein. However, to obviate any distortion of the tooth forms in bending the corrugated strip the said strip may be weakened intermediate the roots of succeeding teeth as indicated at 8, Fig. 3. This is effected by providing a slight rib or bead 9 upon the forming member 4 intermediate the teeth 6 upon which the strip is forcibly driven by the action of the forming tool or punch 7. There is thus formed in the inner side of the strip an indentation, as indicated at 8. The corrugated strip being thus weakened at points intermediate the succeeding tooth forms upon the subsequent bending of the strip will yield at these points instead of yielding within the tooth corrugations and thereby obviates any tendency toward distortion of the tooth shape.

In lieu of the localized indentations 8 produced by the head or rib 9 as shown in Fig. 3, the same effect may be obtained by weakening the interconnecting portion of the strip intermediate the succeeding teeth forms as shown at 10, Fig. 4. In this form of rim in lieu of the indentation 8 a gradual variation of thickness of the strip is shown extending throughout the entire intermediate connecting portion of the strip between the roots of the succeeding tooth forms. This is produced by correspondingly shaping the opposing faces of the forming member 7 and the forming member 4.

Such weakening or indentations in the strip are especially desirable when the tooth forms are produced in straight dies by ordinary punch and die methods or when produced upon rotary forming members differing in diameter from that of the finished product. It will be obvious, however, that in either event the degree of distortion due to the subsequent bending of the corrugated strip to annular form may be computed and sufficient allowance be made in the forming operation to compensate for the subsequent distortion. In such event the indentations 8 or the weakening of the strip shown at 10 may be omitted.

The corrugated peripheral strip formed by any suitable method and comprising a series of tooth shapes properly spaced and proportioned containing the desired number of tooth forms or shapes is bent to annular form to ultimately comprise the exterior faces or working surfaces of the teeth of the finished gear product. These sections of corrugated strips or peripheral gear rims as they may now be termed are coated or plated with a suitable soft metal deposit or film such as tin. This may be effected by subjecting the peripheral rim to acid baths such as diluted sulfuric acid or diluted muriatic baths in order to thoroughly cleanse the rim and then submerging it in a bath of molten metal, or by otherwise fusing the metal on the rim or the film may be deposited by any of the well known electroplating methods.

The ends of the corrugated rim sections may be joined one to the other either before or after the tinning operation if so desired. It has been found in practice, however, desirable to tin the plain strip or blank before forming same, and to joint the ends thereof after the forming operation. The corrugated rim section bent to annular form is positioned within the master form or ring 11 the interior of which is accurately shaped and proportioned to the gear to be produced. This master form or ring 11 is preferably of considerable mass and extends the full width of the face of the gear. While a separate or independent master form or ring is desirable for gears of large size, a multiple master form 12 having therein a plurality of circular openings or spaces 13 as shown in Fig. 11 will be found more convenient and economical in the production of small gear pinions.

Figures 7, 10:
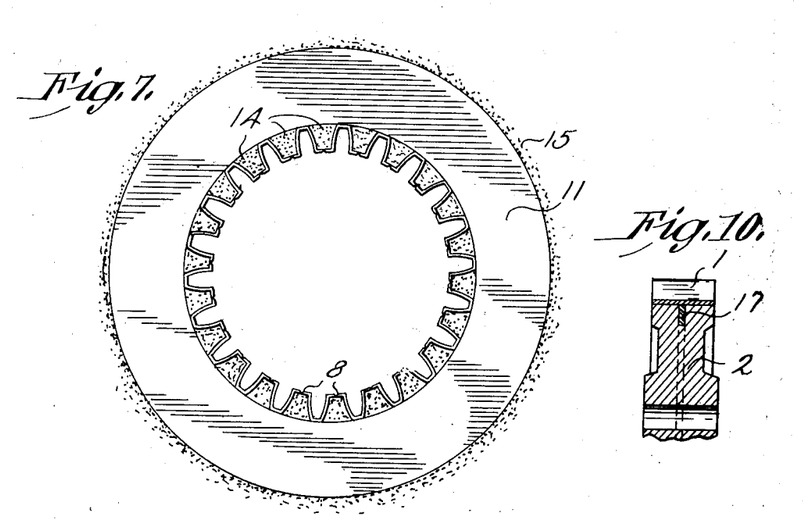
Fig. 7 is a top plan view of the sand mold with the peripheral rim and master form or ring positioned therein.
Fig. 10 is a detail sectional view of a portion of a gear, the result of the process illustrated in Figs. 8 and 9.

After having been positioned within the master form or ring 11 with the points or crowns of the teeth in contact with the inner periphery of the master form the intervening spaces between succeeding teeth are filled or packed with sand as indicated at 14, Fig. 7. The sand mold 15 is prepared in the usual manner employing a pattern conforming to the external dimensions of the master form or ring 11 or the plate 12 as the case may be, and having thereon in properly spaced relation relief configurations corresponding to the hub boss and marginal flange of the gear. This pattern is "rammed up" in the flask filled with sand to produce the usual intaligo form in the sand. The master form 11 with the inclosed corrugated gear rim 1 with the spaces intermediate the teeth packed with sand is then deposited in said sand mold and the top or cope of the mold is adjusted to position in the usual manner. The gear body 2 is then cast within the corrugated peripheral rim 1 by pouring molten metal within the mold.

Molten metal and particularly iron when in molten state, possesses the peculiar characteristic of initially expanding when poured into the mold and subsequently contracting to a degree greater than its initial expansion. Inasmuch as the corrugated rim 1 is firmly held by the surrounding master form or ring 11 against expansion, advantage is taken of the initial expansive tendency of the molten metal, to insure perfect contact between the body 2 of cast metal and the peripheral rim 1. This expansive tendency of the metal when initially poured into the mold results in a compression or condensation of the molten metal within the tooth forms of the rim therefore producing tooth bodies of increased density. This effect is not attainable in ordinary casting methods where the metallic body is free for lateral expansion. The rigid confinement of the metallic body within the master form or ring thereby produces a new result. The master form or ring 11 being of considerable mass does not become quickly heated from the molten mass within the corrugated rim and therefore serves to chill the points of the teeth rendering them somewhat harder and more durable than the body of the gear. The contact of the molten metal with the metallic film or coating of the inner side of the corrugated rim, fuses the metallic coating and serves to firmly unite the rim with the central body 2. The rim 1 and central body 2 thereby become an integral mass embodying an intermediate film or stratum 3 of metal of different physical characteristics which not only serves as a union between the rim and the central body 2 but also serves as a dampening element to interrupt the vibratory motion of the gear when in use and thereby deaden the clatter and rattle of intermeshing gears rendering them less noisy in operation. The contraction of the central body 2 as it cools also tends to contract with it the corrugated rim 1 with which it is fused during the casting operation, thus enabling the easy removal of the gear which has now become a single integral body from the master form or ring 11.

Figures 8, 9, 11:
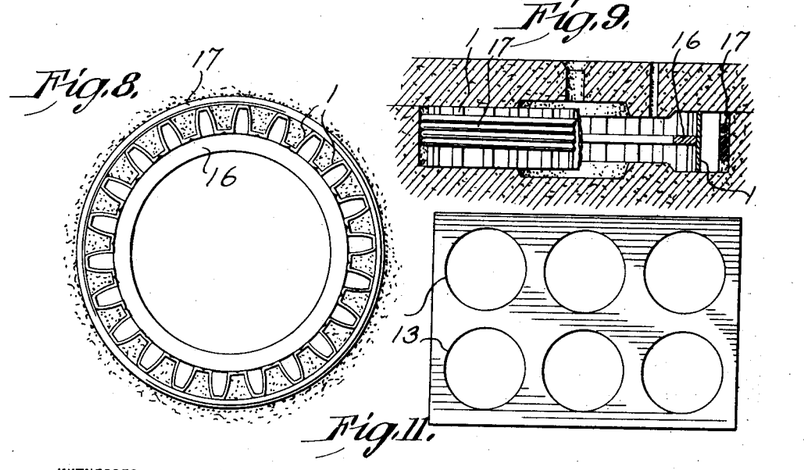
Fig. 8 is a similar view of a sand mold embodying a modification of the process or method of producing the gear.
Fig. 9 is a sectional view of the sand mold producing the gears in accordance with the process illustrated in Fig. 8.
Fig. 11 is a plan view of a modification of the master form.

In Figs. 8 and 9 there is illustrated a modification of the process heretofore described in which the external master form or ring 11 is dispensed with and in which an internal annular form or retaining member 16 of sheet metal is employed in lieu of the external master form or ring 11. This internal annular form 16 serves to retain the true circular form of the corrugated rim which is compressed into contact with the internal form 16 by inclosing helical spring coils 17 which tend to contract upon the periphery of the corrugated rim 1. In operating this modified method the internal annular form 16 and the inclosing helical coils 17 together with the corrugated rim 1 are preferably assembled in their relative positions prior to the tinning or metal coating operation as hereinbefore described. While this coating or deposit of a metal film upon the corrugated rim has been termed "tinning" it is to be understood that it is not limited to the application of metallic tin alone, but other metals or substances may be employed in lieu of tin.

The annular support or form 16 and the inclosing coils 17 are preferably, although not necessarily, temporarily secured either by soldering, brazing, electric welding, or are attached without direct engagement, by wiring them to the rim.

Figure 18:
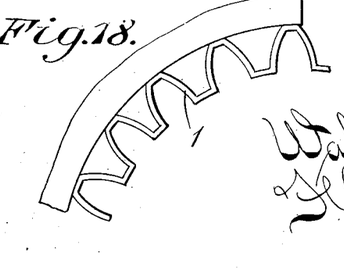
Fig. 18 is a detail view of a modification.

Like the preceding described method, a pattern is employed for forming in the sand of the mold an intaglio design equal in diameter to the external diameter of the inclosing coils 17 and having thereon surface configurations corresponding to the hub boss and marginal flanges of the gear. The rim 1 with the assembled support or annular form 16 and inclosing coils 17 are deposited in the intaglio design or pattern formed in the sand mold and molten metal is poured within the mold as before described. This molten metal flows over and around the annular reinforcement or supporting member 16, inclosing said annular member 16 and firmly uniting therewith and with the interior walls of the corrugated peripheral rim 1 of the gear. The result is the formation of an integral body of which the corrugated peripheral rim 1 forms an external stratum. Intermediate this external stratum or rim and the central gear body is an interposed stratum of metal of different physical characteristics which as before mentioned serves as a dampening element to deaden the rattle or sound of the gears. This same dampening stratum will extend also about the annular support or form member 16. This form member 16 is permanently embedded in the body 2 of the gear where it forms an additional reinforcement member serving to distribute the unequal strains to which the gear is subjected and preventing the disintegration and breakage of the gear. In this mode of procedure, the intervening spaces between the succeeding teeth may if desired be filled or packed with sand, but are preferably left open, as shown in Fig. 18, to provide intervening air chambers which serve to chill or cool the metal forming the bodies of the teeth. The encircling coils 17 about the rim being preferably firmly attached to several of the tooth corrugations and being in contact with the corrugated rim only at the points of the teeth, does not readily absorb the heat from the molten mass within the corrugated rim and therefore tends to resist the expansion of the mass as before described. By the time that the encircling coils 17 have absorbed sufficient heat to materially expand them, the body of metal within the tooth corrugations of the rim has cooled sufficiently to have passed beyond its expansive state and the only result of the heating of the encircling coils 17 is to separate the coils from the corrugated rim at their points of attachment, whereby said coils and the gear rim which is now an integral part of the cast gear will fall apart upon their removal from the sand mold. The coils 17 serve to hold the corrugated rim in close contact with the form or support 16, thereby insuring a perfect circular formation of the rim. The resulting gear will be similar to that produced by the first described method. Such gear will possess smooth uniform teeth and will be capable of being placed in operation without the necessity of special machining or finishing operations. Such gears will possess unusual tensile strength and inasmuch as their vibration is interrupted or deadened by the embodied zone or stratum of characteristically different material, they will be found less noisy in operation.

Figure 12:
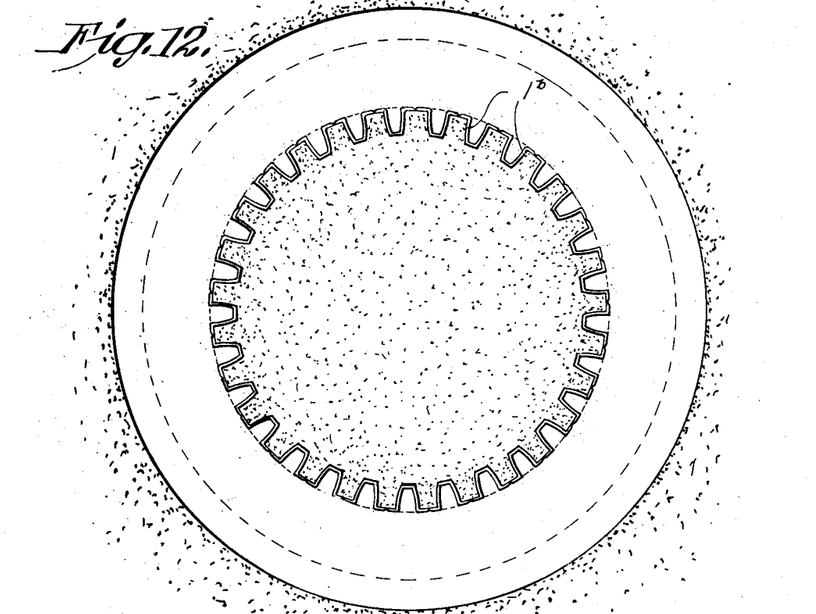
Fig. 12 is a top plan view of a sand mold for an internal gear showing the relative location of the toothed or corrugated rim and the master form or ring positioned therein.

In producing an internal gear by this process the corrugated toothed strip or rim 1$^b$ before described is bent in the reverse direction into annular form and the ends joined as described. This reversed annular toothed rim is then positioned within a master form or ring 11 as shown in the plan view, Fig. 7, except that the corrugated or toothed rim is reversed with the points or crowns of the teeth directed inward and the roots of the teeth resting upon the master ring or form. The entire interior of the annular toothed rim is then filled with core sand or like material and "rammed up" quite hard to form a solid resistant body. During this core forming process the annular master form or ring 11 accurately maintains the circular shape of the toothed rim. When the core or filling of the rim has been completed and baked or hardened, the annular master form or ring is removed and the filled band or gear form is inserted in a previously formed sand mold as shown in Fig. 12. The metal or other material while in a molten or plastic state is cast in the sand mold around the corrugated rim, conforming to and filling the tooth spaces of the rim as before described. It will be understood that this rim like that for spur gears is previously tinned or coated to insure a perfect union of the metals and to provide a dampening or anti-vibratory stratum in the product. The inclosed core or filling of hardened or baked material resists any yielding or warping tendency of the flexible corrugated rim thereby insuring gear products perfectly circular in form.

Figure 13:
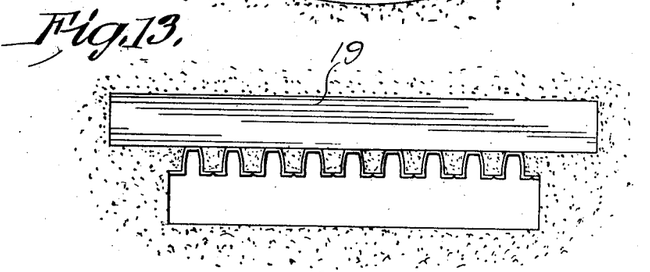
Fig. 13 is a similar view of a gear rack.

In producing a gear rack or other straight toothed element the same steps are involved except the toothed rim is not curved but is employed in straight alined relation and the points of the teeth are abutted upon a straight bar 19 which serves the same purpose as the master form or ring 11. This bar resists any tendency of the teeth to move or yield under the pressure of the cast material and serves to maintain the alinement of the produced member. The rim is previously tinned or coated and the intervening spaces are filled with sand as before described.

As shown in Figs. 14 to 17 inclusive, the same method and steps are employed in producing a cam. The only material difference is the fact that the peripheral rim or strip is not corrugated but is previously shaped over suitable form to agree with the outline of the proposed cam. In reality gears and cams are closely related, the former being practically a cam having a succession of spaced operating surfaces.

Figure 14:
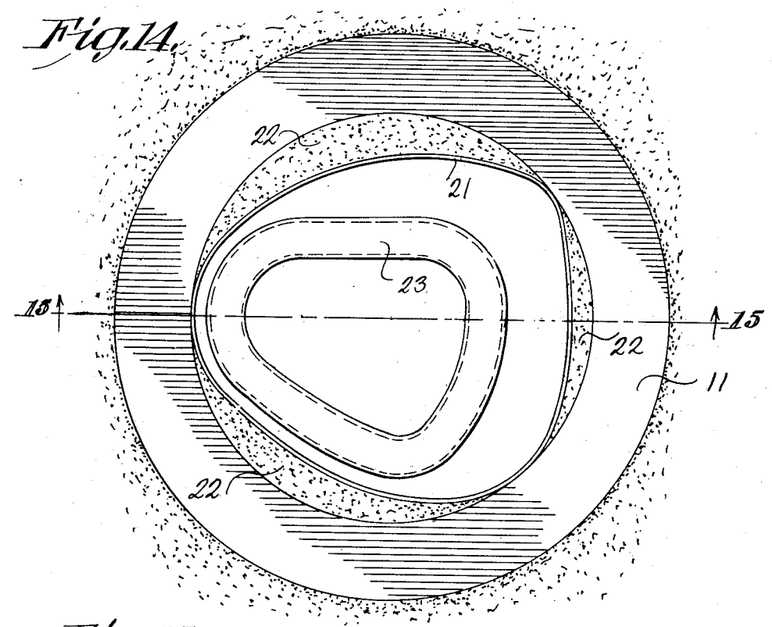
Fig. 14 is a top plan view of a sand mold for a combined peripheral and box cam.
Figures 15, 16, 17:
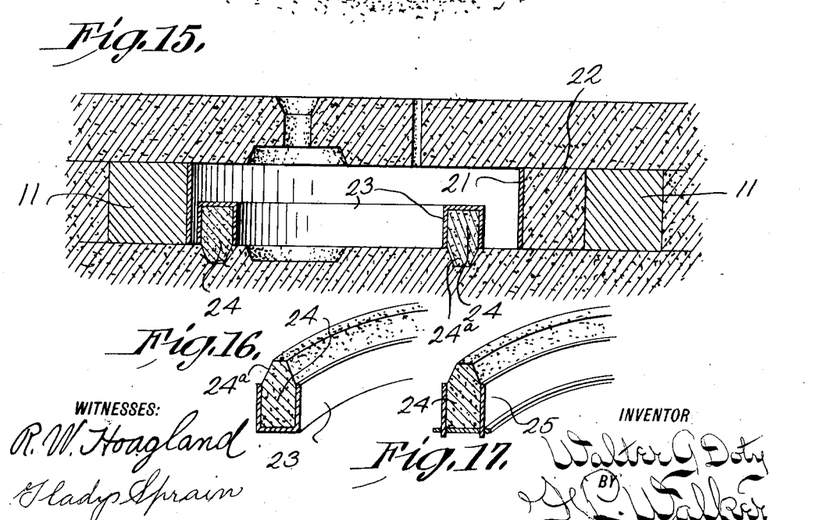
Fig. 15 is a transverse sectional view of the sand mold for the gear element shown in Fig. 14.
Figs. 16 and 17 are detail views of the box cam insert for producing a finished smooth surfaced cam groove in the cam element.

Referring to Fig. 14, the peripheral rim 21 previously shaped and proportioned to agree with the outline of the desired cam and tinned or coated as described, is positioned within an encircling master form or ring 11 and the intervening spaces 22 between the rim 21 and the interior of the master form or ring are packed with sand or like material. If the element is to be merely a peripheral cam the interior of the peripheral rim 21 is then filled with molten metal or plastic self-hardening material, according to the nature of the element to be produced. The resulting element is a body of metal or other hard non-yielding material inclosed within a peripheral band of the desired shape which affords a smooth efficient working surface. In the event that the cam desired is of the box type or is to be provided with a cam groove or channel a form element or channel 23 of sheet metal agreeing with the shape and proportion of the required cam groove is provided. A core 24 of sand is rammed up in this sheet metal form. This core preferably projects somewhat beyond the form as shown at 24ª to engage in a suitable core print formed in the bottom of the sand mold whereby the sheet metal form is accurately located in the cam mold. It is to be understood that the sheet metal form 23 is previously tinned or coated as before described. Molten metal or other plastic or self-hardening material is then poured or otherwise molded within the sand mold or within the rim 21 in the event that a peripheral working surface is also desired and around and inclosing the sheet metal form 23. Upon removing the element from the mold and discharging the sand from the interior of the sheet metal form 23 an accurately formed and proportioned cam groove possessing uniform and smooth working surfaces will be found in the product. Under ordinary methods of production, cams involving grooves or channels are quite difficult and expensive to manufacture. The processes hereinbefore described enables the production of such box cams with accurately proportioned and smoothly finished surfaces at minimum cost without the necessity of expensive machinery and highly skilled labor.

While the gears and cams illustrated in the drawings are somewhat elementary in character it is to be understood that cams and gears of various types and modifications may be produced by this process. Moreover, it is to be understood that the term "gears" as it appears throughout the description and claims is not limited to spur gears and pinions but is to be interpreted as including internal gears, bevel or miter gears, spiral gears, worm gears, gear racks, segmental and other gear elements and various types and modifications of cams. While cast iron is the material usually employed at this time for the main or supporting body, other metals or alloys may be used, as may also other rigid non-elastic or non-yielding materials such as phenolic condensation products or self-hardening materials capable of being molded. The term cast iron where employed herein and in the claims is to be construed as including the various alloys of which iron is the characteristic element, and derivatives of iron including cast steel.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statutes, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:—

1. The herein described process of forming gears, comprising forming a corrugated tooth strip, weakening the strip at points intermediate the teeth, flexing said strip to form the rim of the gear, the distortion occurring at such weakened points without material distortion of the shape of the tooth corrugations, coating the interior face of the rim with a fusible metal, and casting a molten metal body within said rim.

2. The herein described process of forming gears, comprising forming a corrugated tooth rim embedding said rim in a suitable mold, rigidly limiting the expansion of said rim independent of the mold, and pouring molten metal within the rim the expansive tendency of which against the unyielding rim insures uniform contact of the cast body with the rim.

3. The herein described process of forming gears comprising forming a corrugated tooth rim, inclosing said body in an encircling ring, inserting the inclosed rim and encircling ring in a suitable mold and pouring molten metal within the rim.

4. The herein described process of forming gears, comprising forming a corrugated tooth rim, embedding the rim in a suitable mold, providing an annular support independent of the mold to which the rim is made to conform, and pouring molten metal within the rim.

5. The herein described process of forming gears, comprising forming a corrugated tooth rim, inclosing the rim in an external annular metallic support, locating the external annular support and inclosed rim in a suitable mold and pouring molten metal within the rim.

6. The herein described process of forming gears, comprising forming a corrugated tooth rim, inclosing the rim in an annular metallic inclosure, inserting within the rim an annular form member, locating the assembled rim, inclosing member and inclosed form member in a suitable mold, and pouring molten metal within the rim and around the form member thereby embedding said form member therein.

7. The herein described process of producing machine and like elements, comprising forming a marginal rim of the required size and contour, embedding said rim in a suitable mold, providing a rigid non-yielding abutment separable from said mold engaged by the marginal rim at spaced intervals, employing said contoured rim as a portion of a mold and molding a rigid non-yielding main body in juxtaposition to said rim, the lateral deflection of the rim being prevented during the molding operation by said rigid non-yielding abutment.

8. The herein described process of producing machine and like elements, comprising shaping a flexible strip of sheet metal to agree with the contour of the desired article, inserting the shaped strip in a mold of which the strip defines one face, rigidly supporting said contoured strip independent of the mold against lateral deflection while in the mold.

9. The herein described process of forming gear elements comprising corrugating a strip of sheet metal into the outline form of a succession of gear teeth, locating said corrugated strip in a mold, providing a rigid non-yielding abutment separable from the mold against which the points of the teeth formed in said strip bear, whereby said teeth will be held in prearranged alinement, and molding a rigid non-yielding body in juxtaposition to said corrugated strip.

10. The herein described process of producing machine and like elements, comprising shaping a flexible strip of sheet metal to agree with the contour of the desired article, coating said strip with a film of metal of different characteristic, depositing said contoured strip in a mold, rigidly supporting said strip independent of the mold at spaced intervals against lateral deflection, and molding a rigid non-yielding main body in juxtaposition to said strip.

11. The herein described process of producing machine and like elements, comprising shaping a flexible strip of sheet metal to agree with the contour of the desired article depositing said contoured strip in a suitable mold, and pouring molten iron within the contoured strip to completely fill the same.

12. The herein described process of producing machine and like elements to produce therein smooth finished recesses, comprising shaping a body of sheet metal to agree with the contour of the desired recess, depositing the contoured sheet metal body in a suitable mold and pouring molten iron within said mold and around said contoured body.

13. The herein described process of producing cast iron gears having smoothly finished tooth surfaces without the necessity of machining same, comprising forming a corrugated tooth rim of sheet metal, and casting therein a body of cast iron completely filling said rim, with which said rim unites, substantially as specified.

In testimony whereof I have hereunto set my hand this 30th day of November, A. D. 1917.

WALTER G. DOTY.

Witnesses:
EDW. E. DUNCAN,
MARVEL HOAGLAND.